United States Patent [19]

Harasaki

[11] Patent Number: 4,723,811
[45] Date of Patent: Feb. 9, 1988

[54] FRONT BODY STRUCTURE FOR MOTOR VEHICLE

[75] Inventor: Hayatsugu Harasaki, Hiroshima, Japan

[73] Assignee: Mazda Motor Corporation, Hiroshima, Japan

[21] Appl. No.: 855,637

[22] Filed: Apr. 25, 1986

[30] Foreign Application Priority Data

Apr. 27, 1985 [JP] Japan ............... 60-63461[U]
Apr. 27, 1985 [JP] Japan .................. 60-91592

[51] Int. Cl.⁴ ............................................. B62D 25/08
[52] U.S. Cl. .................................. 296/194; 296/188; 296/198
[58] Field of Search ............... 296/185, 187, 188, 189, 296/192, 193, 194, 198, 203, 29, 30

[56] References Cited

U.S. PATENT DOCUMENTS

| | | | |
|---|---|---|---|
| 3,596,978 | 8/1971 | Wessells et al. | 296/194 |
| 4,542,934 | 9/1985 | Komatsu et al. | 296/198 X |
| 4,545,612 | 10/1985 | Harasaki | 296/194 X |
| 4,550,948 | 11/1985 | Hamada et al. | 296/202 |
| 4,560,198 | 12/1985 | Katano et al. | 296/198 X |
| 4,669,777 | 6/1987 | Harasaki et al. | 296/194 |

FOREIGN PATENT DOCUMENTS

| | | |
|---|---|---|
| 52-85215 | 6/1977 | Japan . |
| 5628061 | 11/1977 | Japan . |
| 55-114772 | 8/1980 | Japan . |
| 0094874 | 5/1985 | Japan .................. 296/194 |

Primary Examiner—Robert B. Reeves
Assistant Examiner—Russell D. Stormer
Attorney, Agent, or Firm—Fleit, Jacobson, Cohn & Price

[57] ABSTRACT

A vehicle body front structure including a wheel apron extending forward from a hinge pillar and having a front end connected with the radiator shroud. A wheel apron reinforcement structure comprises an inner panel member and an outer panel member. The inner panel member extends between the hinge pillar and the radiator shroud and connected to the wheel apron. The outer panel member is connected to the inner member to form a structure of closed cross-section which extends from the hinge pillar to a position rearward the radiator shroud. The structure of closed cross-section has a height which increases toward rearward. The hinge pillar is of a closed cross-section and provided with reinforcement ribs which bridge the space in the hinge pillar at a heightwise position where the wheel apron reinforcement is connected to the hinge pillar.

11 Claims, 10 Drawing Figures

FRONT BODY STRUCTURE FOR MOTOR VEHICLE

BACKGROUND OF THE INVENTION

1. Field of the Invention

The present invention relates to a motor vehicle front body structure and more particularly to a vehicle front body structure having a front engine compartment.

2. Description of the Prior Art

In a motor vehicle body having an engine compartment located forward the passenger compartment, side walls of the engine compartment are constituted by wheel aprons which extend forward from front hinge pillars. The front ends of the wheel aprons are connected to the opposite ends of a transversely extending radiator shroud. The wheel apron is provided at the transversely inner side with a suspension tower for receiving an upper end of a suspension strut assembly. In order to provide the wheel apron with a sufficient strength and rigidity, it has been known to form longitudinally extending frame structures of closed cross-section along upper and lower portions of the wheel apron. Examples of such front body structure are shown by Japanese utility model application No. 54-14604 which has been filed on Feb. 6, 1979 and disclosed for public inspection on Aug. 13, 1980 under the disclosure No. 55-114772.

In the conventional body structure, the wheel apron and the longitudinal frame structures are connected at the rear ends with a hinge pillar which is also of a structure of closed cross-section. In Japanese utility model application No. 50-173077 filed on Dec. 23, 1975 and disclosed for public inspection on June 25, 1977 under the disclosure No. 52-85215, there is disclosed a hinge pillar structure which includes a substantially planar inner panel and an outer panel of a hat-shaped cross-section welded at the opposite side edges to the inner panel to form a structure of closed cross-section. The hinge pillar includes box-shaped reinforcements located at vertically spaced positions to bridge the space between the inner and outer panels to thereby provide the hinge pillar with an increased lateral rigidity.

In a motor vehicle structure, it is generally desired for the purpose of safety that the front body structure is collapsed progressively from the front end in case of a vehicle crash. In case where the crash energy is not fully absorbed by the collapse of the front body structure, the remaining crash energy is transmitted from the wheel apron to the hinge pillar. Although the hinge pillar structure of the Japanese utility model application No. 50-173077 has reinforcements, it is not satisfactory for the purpose of receiving the longitudinally directed crash energy because the reinforcements are intended to strengthen the hinge pillar only in the lateral direction but are spaced apart from the front and rear walls of the outer panel of the hinge pillar structure.

SUMMARY OF THE INVENTION

It is therefore an object of the present invention to provide a motor vehicle front body structure which is highly safe even under a vehicle crash at the front end. Another object of the present invention is to provide a vehicle front body structure in which the hinge pillar structure is reinforced so that it is prevented from being collapsed but can transmit the crash energy toward rear body section.

According to the present invention, the above and other objects can be accomplished by a motor vehicle front body structure including a pair of wheel aprons, each extending substantially longitudinally to define a side wall of an engine compartment, a hinge pillar structure of a closed cross-section having a front and rear walls, said wheel apron being connected at a rear end with said hinge pillar structure, a wheel apron reinforcement structure provided on an outer side of each wheel apron to extend substantially longitudinally and connected at a rear end with said hinge pillar, reinforcement means provided in said hinge pillar structure and connecting said front and rear walls of the hinge pillar structure at a portion where said wheel apron reinforcement structure is connected with the hinge pillar structure.

With the structure described above, it is possible to prevent the hinge pillar structure from being collapsed under the crash energy which is transmitted thereto from the wheel apron reinforcement. Therefore, it is possible to prevent the hinge pillar and the wheel apron structure from being deformed toward the passenger compartment.

The above and other objects and features of the present invention will become apparent from the following description of a preferred embodiment taking reference to the accompanying drawings.

DESCRIPTION OF THE PREFERRED EMBODIMENT

Figure 1:
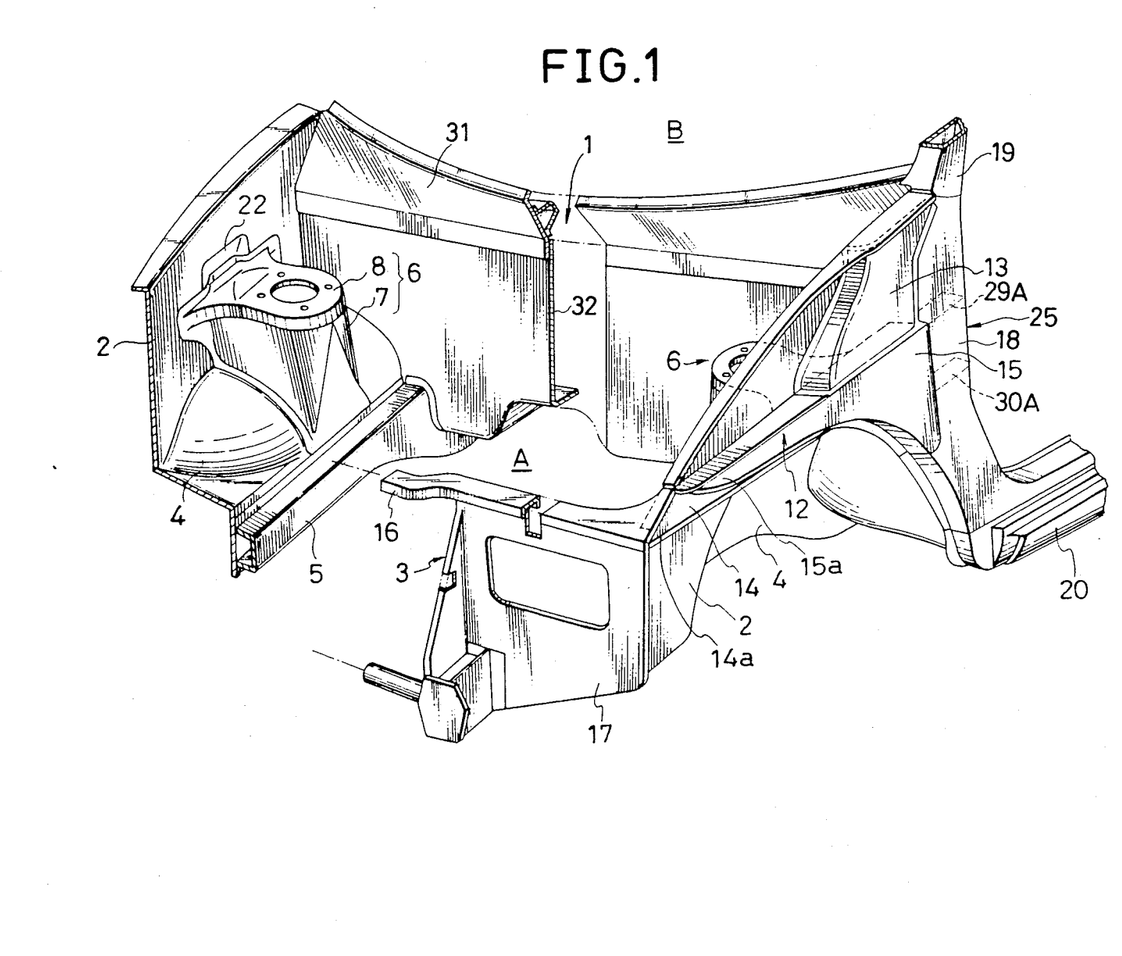
FIG. 1 is a fragmentary perspective view of a motor vehicle front body structure embodying the features of the present invention.
Figure 4:
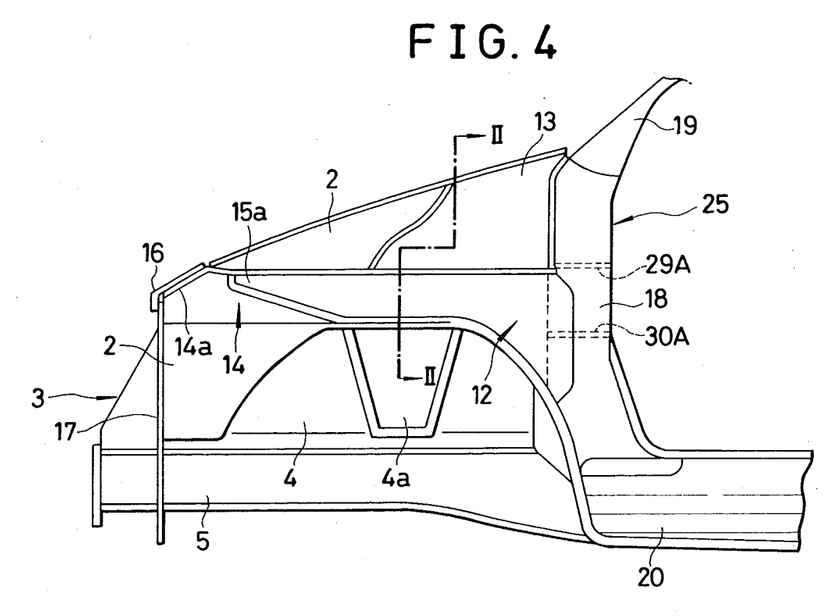
FIG. 4 is a side view of the side structure as seen from the outside.

Referring to the drawings, particularly to FIG. 1, there is shown a motor vehicle front body structure including a dash panel 1 which separates the front engine compartment A from the rear passenger compartment B. Each end of the dash panel 1 is connected with a front door hinge pillar 18 of a closed cross-section. The hinge pillar 18 constitutes a lower part of a pillar structure 25. As shown in FIG. 4, the hinge pillar 18 is upwardly extended to form a front pillar 19 which constitutes an upper part of the pillar structure. The lower end of the hinge pillar 18 is connected with a rearwardly extending side sill 20 as well known in the art. The hinge pillar 18 and the front pillar 19 define a front periphery of a side door opening and the side sill 20 defines a lower periphery of the side door opening. A side door (not shown) is provided in the door opening and connected with the hinge pillar 18 by means of hinges (not shown).

Referring again to FIG. 1, it will be noted that the structure shown therein further includes a wheel apron 2 at each side. The wheel apron 2 is connected at the rear end with the hinge pillar 18 and extends forward from the hinge pillar 18 to define a side wall of the engine compartment A. Between the front ends of the wheel aprons 2 at the opposite sides of the structure, there is a transversely extending radiator shroud 3 which defines a front wall of the engine compartment A. As shown in FIG. 1, the front end of the wheel apron 2 is connected with the upper portion of each end of the radiator shroud 3.

Figure 5:
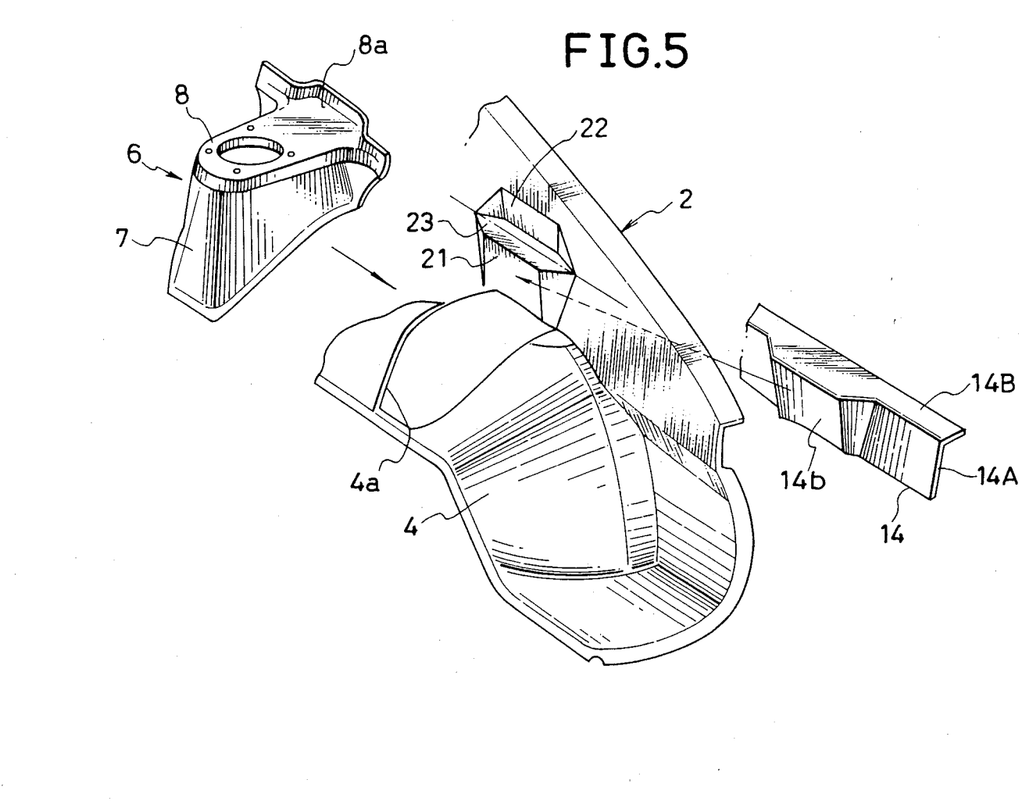
FIG. 5 is an exploded perspective view of the structural components in the side structure.

The wheel apron 2 is formed with a wheel arch 4 which bulges inward into the engine compartment A to provide a room for a front wheel (not shown) outside the wheel apron 2. Along the lower edge, the wheel apron 2 is provided with a front frame 5 which is of a channel-shaped cross-sectional configuration and welded at the opposite side edges to the lower edge portion of the wheel apron 2 to form a structure of enclosed cross-section. As shown in FIG. 5, the wheel apron 2 is formed with a cutout 4a at the top portion of the wheel arch 4 and a suspension tower 6 is connected with the wheel apron 2 to cover the cutout 4a.

Figure 2:
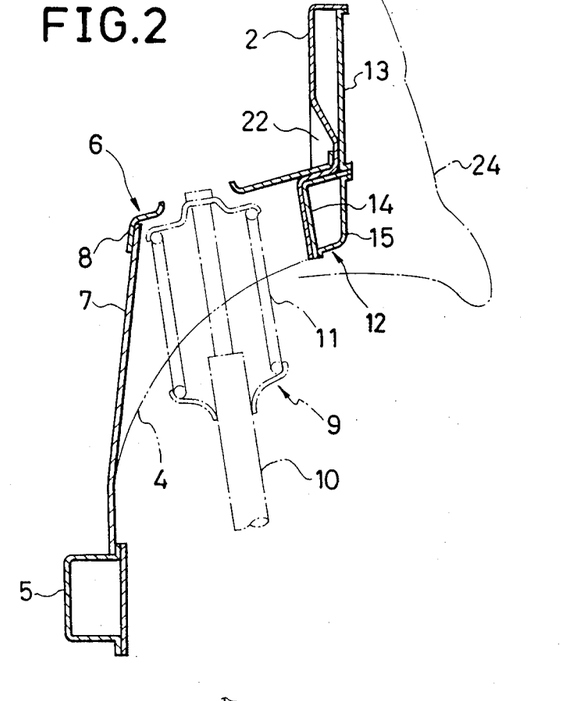
FIG. 2 is a sectional view taken along a transverse vertical plane passing through the suspension tower.

As shown in FIG. 5, the suspension tower 6 comprises a side wall 7 and a top wall 8 which are connected together and the top wall 8 is adapted to receive, as shown in FIG. 2, the top end of a suspension strut assembly 9 which extends upward through the cutout 4a in the wheel apron 2. In FIG. 2, it will be noted that the suspension strut assembly 9 is shown as including a damper strut 10 and a coil spring 11.

Figure 6:
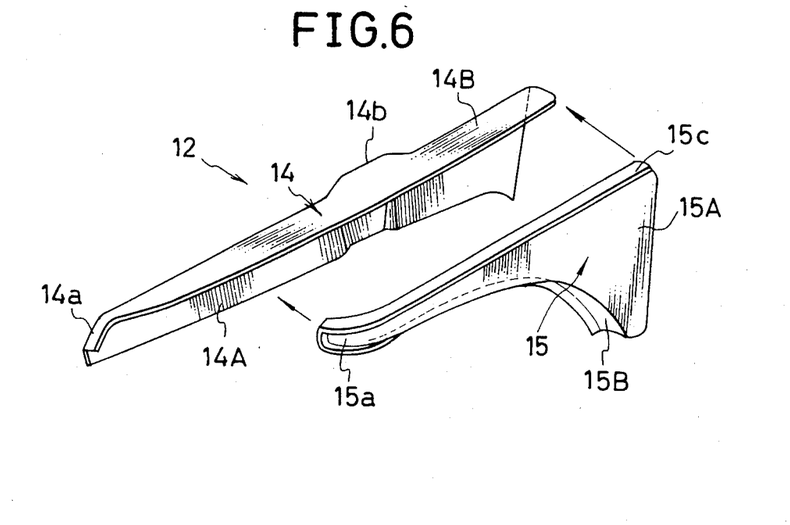
FIG. 6 is an exploded perspective view of the wheel apron reinforcement structure.

At the upper portion, the wheel apron 2 is provided with a wheel apron reinforcement 12 and an upper reinforcement 13 as shown in FIGS. 1 and 4. As shown in FIG. 6, the wheel apron reinforcement 12 includes an inner reinforcement member 14 and an outer reinforcement member 15. The inner member 14 is substantially of an L-shaped cross-section having a vertical leg 14A and a transversely outwardly extending flange 14B which is contiguous to the upper edge of the vertical leg 14A. The inner member 14 extends between the hinge pillar 18 and the radiator shroud 3 throughout the length of the wheel apron 2 so that the lower edge of the vertical leg 14 is located substantially at the level of the top of the wheel arch 4. The inner member 14 is welded at the vertical leg 14A to the wheel apron 2.

As shown in FIG. 1, the radiator shroud 3 includes an upper frame member 16 and a head lamp panel 17 which are connected to the front end of the wheel apron 2. The inner member 14 of the wheel apron reinforcement 12 extends to the portion where the upper frame member 16 of the radiator shroud 3 is connected to the wheel apron 2. The inner member 14 has a front end 14a which is connected to the upper frame member 16 of the radiator shroud 3. It will therefore be understood that the connection between the radiator shroud 3 and the wheel apron 2 is reinforced by the inner member 14 of the wheel apron reinforcement 12.

The outer member 15 of the wheel apron reinforcement 12 is of a substantially Z-shaped cross-section having a vertical wall 15A, a transversely inwardly extending lower flange 15B and a transversely outwardly extending upper flange 15C. The outer member 15 extends forward from the rear end of the inner member 14 and connected to the inner member 14 by being welded at the edge portion of the lower flange 15B to the vertical wall 14A of the inner member 14 and at the upper flange 15C to the flange 14B of the inner member 14. Thus, a reinforcement structure of closed cross-section is formed by the inner member 14 and the outer member 15 of the wheel apron reinforcement 12. The members 14 and 15 are connected at the rear ends to the hinge pillar 18.

Figure 7:
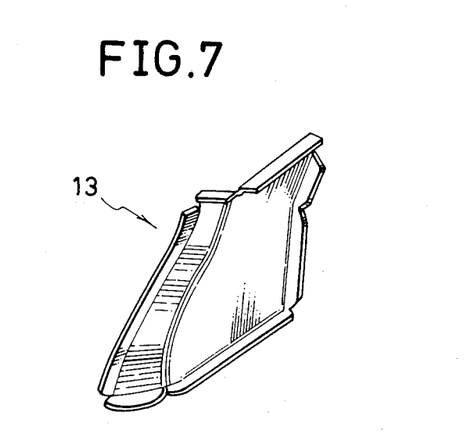
FIG. 7 is a perspective of the rear upper reinforcement.

The upper reinforcement 13 is of a configuration as shown in FIG. 7 and located above the wheel apron reinforcement 12 at the rear portion of the wheel apron 2. The reinforcement 13 is connected to the wheel apron 2, to the flange 14B of the inner member 14 of the wheel apron reinforcement 12 and to the hinge pillar 18 to thereby reinforce the rear upper portion. The wheel apron 2 has a height which increases toward rearward and the reinforcement 13 is correspondingly increased in height toward rearward. Further, the reinforcement 13 has a front end portion which is tapered toward forward. The front end of the reinforcement 13 is located forward the suspension tower 6 so that the load from the suspension strut 9 is supported by the reinforcement 13.

Figure 3:
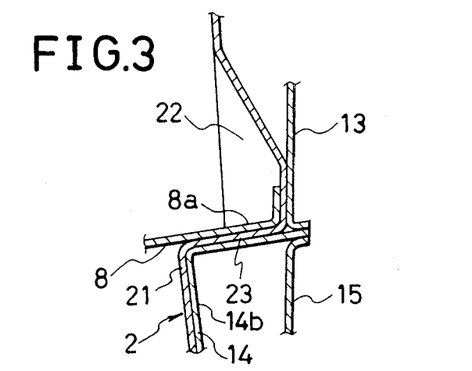
FIG. 3 is an enlarged sectional view showing the arrangement of the wheel apron reinforcement structure in the vicinity of the suspension tower.

In FIGS. 3 and 5, it will be noted that the wheel apron 2 is formed at a portion above the wheel arch 4 with an inward projection 21 which continues at the upper end through a wall 23 to an outward projection 22. The inner member 14 of the wheel apron reinforcement 12 is formed with an inward projection 14b which corresponds in configuration with the inward projection 21 on the wheel apron 2 and is fitted to the recess formed in the wheel apron 2 by the inward projection 21. The top wall 8 of the suspension tower 6 has an outward extension 8a which is laid on the wall 23 and connected to the wheel apron 2 together with the inner member 14 of the wheel apron reinforcement 12 and the upper reinforcement 13 as shown in FIG. 3. The outer side of the wheel apron 2 is covered by a front fender 24.

It will be noted in FIG. 4 that the front end 15a of the outer member 15 of the wheel apron reinforcement 12 is located at a position rearwardly spaced from the radiator shroud 3 and the height of the member 15 is gradually increased toward rearward. In case where the car has crashed at the front end, therefore, the wheel apron 2 is collapsed at first at the front end portion where only the inner member 14 is provided for reinforcement. Where the shock load is large so that the load is not absorbed only by the collapsing of the front portion, the wheel apron reinforcement 12 starts to be collapsed at the front end portion of the outer member 15 and the collapsing gradually progresses toward rearward depending on the shock load.

Figure 8:
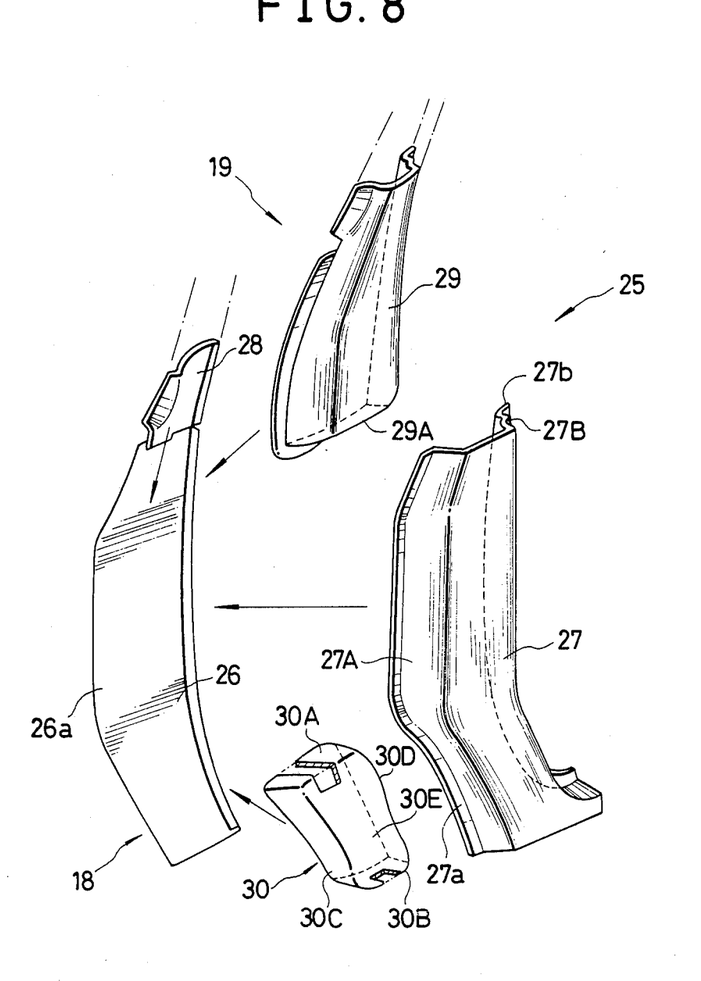
FIG. 8 is an exploded perspective view of the hinge pillar structure.
Figure 9:
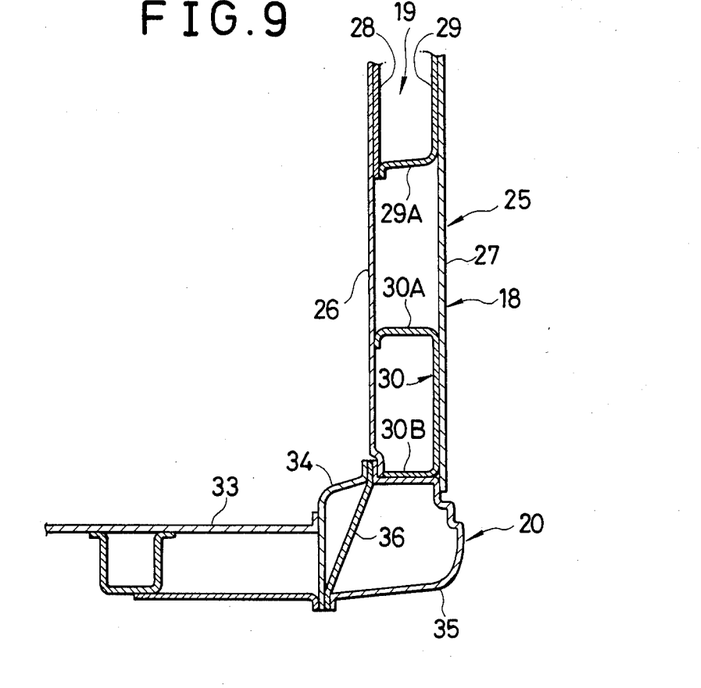
FIG. 9 is a vertical sectional veiw of the hinge pillar structure.
Figure 10:
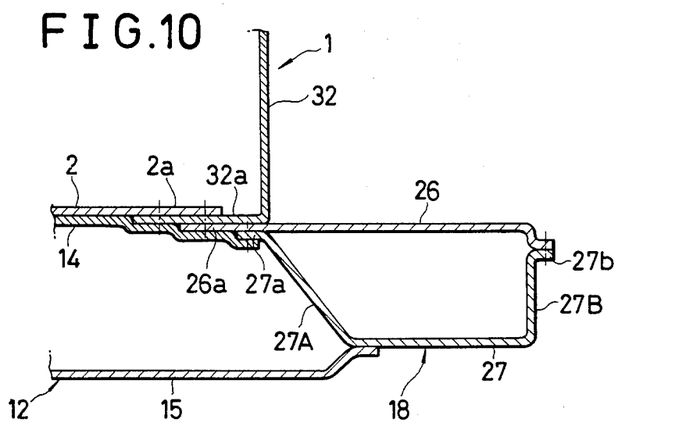
FIG. 10 is a horizontal sectional view showing the connection of the hinge pillar with the dash panel and the wheel apron.

Referring now to FIGS. 8 and 9, it will be noted that the hinge pillar 18 constituting the lower part of the pillar structure 25 comprises a substantially planar lower inner pillar panel 26 and a lower outer pillar panel 27 of a hat-shaped configuration. The inner panel 26 and the outer panel 27 are welded together along the opposite side edges to form a structure of closed cross-section. More specifically, the outer panel 27 has a front wall 27A and a rear wall 27B which are respectively formed with connecting flanges 27a and 27b welded to front and rear edge portions of the inner panel 26 as shown in FIG. 10.

The front pillar 19 constituting the upper portion of the pillar structure 25 comprises a substantially planar upper inner pillar panel 28 and an upper outer pillar panel 29 of a hat-shaped cross-section which are connected together along the opposite side edge portions to form a structure of closed cross-section. It will be noted in FIG. 9 that the lower end portion of the front pillar 19 is fitted and connected to the upper end portion of the hinge pillar 18.

As shown in FIG. 9, the side sill 20 is comprised of an inner panel 34 and an outer panel 35 which are welded together along the opposite edge portions to form a structure of closed cross-section. A reinforcement 36 is provided across the cross-section of the side sill 20. The hinge pillar 18 is welded at the lower end portion to the side sill 20. A floor panel 33 is welded at a side edge portion to the inner panel 34 of the side sill 20.

In FIG. 9, it will further be noted that the hinge pillar 18 is provided at the lower end portion with a reinforcement 30 which is of a box-shaped configuration opened toward laterally inward side. The reinforcement 30 has an upper wall 30A, a lower wall 30B, a front wall 30C, a rear wall 30D and a laterally outer wall 30E as shown in FIG. 8. The outer wall 30E of the reinforcement 30 is welded to the outer wall of the hinge pillar outer panel 27 and the front and rear walls 30C and 30D are welded to the front and rear walls 27A and 27B of the hinge pillar outer panel 27. The lower wall 30B is welded to the upper wall of the side sill outer panel 35. The upper wall 30A of the reinforcement 30 bridges the space between the inner and outer hinge pillar panels 26 and 27 to constitute a rib structure for the hinge pillar 18. It will be noted in FIG. 4 that the upper wall 30A of the reinforcement 30 is located at a height corresponding substantially to the vertical center of the rear end of the wheel apron reinforcement 12.

As shown in FIG. 9, the outer panel 29 of the front pillar 19 is formed with a lower wall 29A which bridges the space between the inner and outer hinge pillar panels 26 and 27. Thus, the lower wall 29A of the panel 29 provides a reinforcing rib for the hinge pillar 18. It will be noted in FIG. 4 that the wall 29A is located at a height corresponding to the upper edge of the wheel apron reinforcement 12.

Referring now to FIG. 10 as well as FIG. 1, it will be noted that the dash panel 1 is constituted by an upper panel 31 and a lower panel 32 which are welded together. The lower panel 32 is formed at a side edge portion with a connecting flange 32a which is laid over the rear edge portion of the wheel apron 2. The inner panel 26 of the hinge pillar 18 has a forward extension 26a which are laid over the connecting flange 32a. The rear edge portion of the inner panel 14 of the wheel reinforcement 12 is laid over the connecting flange 32a, the forward extension 26a of the hinge pillar inner panel 26 and the connecting flange 27a of the hinge pillar outer panel 27. These panel portions which are superposed with each other are welded together to provide a rigid connection. The outer panel 15 of the wheel apron reinforcement 12 is welded at the rear edge to the outer panel 27 of the hinge pillar 18.

In the structure described above, when the crash energy is very high and cannot be fully absorbed, the remaining energy is transmitted from the wheel apron reinforcement 12 to the hinge pillar 18. Since the hinge pillar 18 is reinforced by the lower wall 29A of the front pillar outer panel 29 and the upper wall 30A of the reinforcement 30, the hinge pillar 18 can withstand the crash energy without being collapsed. The front wall 27A of the hinge pillar outer panel 27 is rearwardly inclined as shown in FIG. 10. This configuration is advantageous because the shock load transmitted through the wheel apron 12 and the inner panel 14 of the wheel apron reinforcement 12 can be distributed between the hinge pillar inner panel 26 and the hinge pillar outer panel 27.

The ribs provided in the hinge pillar 18 by the walls 29A and 30A may be substituted by one or more reinforcement members of any configuration which bridges the space between the front and rear walls of the hinge pillar 18. For example, a rod-like member may be provided in a manner that prevents collapsing of the hinge pillar.

The invention has thus been shown and described with reference to a specific embodiment, however, it should be noted that the invention is in no way limited to the details of the illustrated structures but changes and modifications may be made without departing from the scope of the appended claims.

I claim:

1. A motor vehicle front body structure comprising a pair of wheel aprons, each extending substantially longitudinally to define a side wall of an engine compartment, a hinge pillar structure of a closed cross-section having a front wall and a rear wall, said wheel apron being connected at a rear end with said hinge pillar structure, a wheel apron reinforcement structure provided on an outer side of each wheel apron extending substantially longitudinally and connected at a rear end with said hinge pillar, said wheel apron reinforcement structure having an upper edge portion extending substantially horizontally and having a heightwise dimension which increases in a rearward direction, reinforcement means including a first reinforcement member located extending across an internal space of said hinge pillar structure to connect said front and rear walls of said hinge pillar structure at a portion where said wheel apron reinforcement structure is connected with said hinge pillar structure and a second reinforcement member vertically spaced from and located above said first reinforcement member inside said internal space, said second reinforcement member being located at a heightwise position corresponding to the upper edge portion of said wheel apron reinforcement structure to extend across the internal space of said hinge pillar structure, said hinge pillar structure including a lower pillar and an upper pillar, said lower pillar having a lower end portion connected with an upper end portion of said lower pillar, said lower pillar having a lower end wall forming said second reinforcement member.

2. A front body structure in accordance with claim 1, wherein said reinforcement means includes a box-shaped reinforcement member having at least one wall bridging a space in said hinge pillar structure.

3. A front body structure in accordance with claim 2, wherein said hinge pillar structure is connected at a lower end with a side sill extending longitudinally rearward from said hinge pillar structure, said box-shaped reinforcement member having a lower wall connected with said side sill.

4. A front body structure in accordance with claim 2, wherein said hinge pillar structure comprises a substantially planar pillar inner panel and a pillar outer panel of a hat-shaped horizontal cross-section having a front, rear and outer walls, said outer panel being connected at edge portions of said front and rear walls with said inner panel to form a structure of closed cross-section, said box-shaped reinforcement being fitted and connected to said pillar outer panel.

5. A front body structure in accordance with claim 1, wherein said reinforcement means further includes a box-shaped reinforcement member having at least one wall bridging a space in said hinge pillar structure.

6. A front body structure in accordance with claim 1, wherein said wheel apron is provided with a suspension tower for receiving an upper end of a suspension assembly, said wheel apron reinforcement being located at a heightwise level substantially corresponding to an upper end portion of the suspension tower.

7. A front body structure in accordance with claim 1, further comprising a dash panel defining a rear wall of the engine compartment, said dash panel having a forwardly bent connecting flange at each side, said connecting flange being laid on and connected to a rear edge portion of the wheel apron.

8. A front body structure in accordance with claim 7, wherein said hinge pillar structure includes an inner panel and an outer panel which are connected together at side edge portions to form a structure of closed cross-section, said inner panel having a forward extension which is connected to said connecting flange of the dash panel and said wheel apron.

9. A front body structure in accordance with claim 8, wherein said inner panel is of a substantially planar configuration, said outer panel being of a hat-shaped horizontal cross-section having a front and rear walls, said front wall of the outer panel being inclined rearward toward a laterally outward direction.

10. A front body structure in accordance with claim 8, wherein said connecting flange of said dash panel is extended forward beyond a forward extension of said inner panel of said hinge pillar structure and connected to said wheel apron.

11. A motor vehicle front body structure comprising: a pair of wheel aprons, each extending substantially longitudinally to define a side wall of an engine compartment, a hinge pillar structure of a closed cross-section having a front wall and a rear wall, said wheel apron being connected at a rear end with said hinge pillar structure, a first wheel apron reinforcement structure provided on an outer side of each wheel apron extending substantially longitudinally and connected at a rear end with said hinge pillar, said first wheel apron reinforcement structure having an upper edge portion extending substantially horizontally and having a heightwise dimension which increases in a rearward direction, reinforcement means provided in said hinge pillar structure and connecting said front and rear walls of the hinge pillar structure, said hinge pillar structure including a lower pillar and an upper pillar, said upper pillar having a lower end portion connected with an upper end portion of said lower pillar, said reinforcement means including a first member bridging a space between said front and rear walls of said hinge pillar structure at a height corresponding substantially to a vertical center of said rear end of said first wheel apron reinforcement, a second wheel apron reinforcement provided on a rear portion of said wheel apron above said first wheel apron above reinforcement and extending between an upper portion of said wheel apron and an upper portion of said first wheel apron reinforcement.

* * * * *